US011276307B2

(12) United States Patent
Francis et al.

(10) Patent No.: US 11,276,307 B2
(45) Date of Patent: Mar. 15, 2022

(54) OPTIMIZED VEHICLE PARKING

(71) Applicant: International Business Machines Corporation, Armonk, NY (US)

(72) Inventors: Corey Francis, Ballarat (AU); Jorge Andres Moros Ortiz, Melbourne (AU); Khoi-Nguyen Dao Tran, Southbank (AU)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 16/579,893

(22) Filed: Sep. 24, 2019

(65) Prior Publication Data

US 2021/0090437 A1 Mar. 25, 2021

(51) Int. Cl.
*G08G 1/14* (2006.01)
*G05D 1/00* (2006.01)
*H04W 4/40* (2018.01)

(52) U.S. Cl.
CPC ............ *G08G 1/142* (2013.01); *G05D 1/0088* (2013.01); *G08G 1/147* (2013.01); *G08G 1/148* (2013.01); *H04W 4/40* (2018.02)

(58) Field of Classification Search
CPC ...... G05D 1/0088; G08G 1/142; G08G 1/147; G08G 1/148; H04W 4/40
See application file for complete search history.

(56) References Cited

U.S. PATENT DOCUMENTS

| | | | |
|---|---|---|---|
| 8,634,980 B1 | 1/2014 | Urmson | |
| 8,830,322 B2 | 9/2014 | Nerayoff | |
| 9,344,683 B1 | 5/2016 | Nemat-Nasser | |
| 9,449,512 B2 | 9/2016 | Zafiroglu | |
| 9,623,874 B2 | 4/2017 | Baek | |

(Continued)

FOREIGN PATENT DOCUMENTS

JP 2002251690 A 9/2002

OTHER PUBLICATIONS

Ferreira et al., "Self-Automated Parking Lots for Autonomous Vehicles based on Vehicular Ad Hoc Networking", 2014 IEEE Intelligent Vehicles Symposium (IV) Jun. 8-11, 2014. Dearborn, Michigan, USA 978-1-4799-3637-3/14 © 2014 IEEE, 8 pages.

(Continued)

*Primary Examiner* — Quan Zhen Wang
*Assistant Examiner* — Rajsheed O Black-Childress
(74) *Attorney, Agent, or Firm* — Stephanie L. Carusillo

(57) ABSTRACT

Location information associated with a parking area is received. Information about a plurality of vehicles parked in the parking area is determined. A first space located between a first parked vehicle and a first non-movable object located in front of the first parked vehicle is determined. The first space is comprised of a first required space and a first non-required space. A second space located between the first parked vehicle and a second non-movable object located behind the first parked vehicle is determined. The second space is comprised of a second required space and a second non-required space. Responsive to determining that the first non-required space is greater than the second non-required space, the first parked vehicle is moved towards the first space. After moving the first parked vehicle, the first space is equivalent to the first required space.

15 Claims, 4 Drawing Sheets

(56) References Cited

U.S. PATENT DOCUMENTS

| | | | |
|---|---|---|---|
| 9,639,994 B2 | 5/2017 | Beaurepaire | |
| 9,697,733 B1 | 7/2017 | Penilla | |
| 2013/0006469 A1 | 1/2013 | Green | |
| 2015/0070196 A1* | 3/2015 | Beaurepaire | B62D 15/028 340/932.2 |
| 2016/0116293 A1 | 4/2016 | Grover | |
| 2016/0189435 A1* | 6/2016 | Beaurepaire | G06Q 30/0208 705/13 |
| 2017/0329341 A1* | 11/2017 | Rakshit | G08G 1/143 |
| 2017/0329346 A1 | 11/2017 | Latotzki | |

OTHER PUBLICATIONS

Nourinejad et al., "Designing Parking Facilities for Autonomous Vehicles", ResearchGate, Article in Transportation Research Part B Methodological • Mar. 2018, DOI: 10.1016/j.trb.2017.12.017, 34 pages, <https://www.researchgate.net/publication/318350739_Designing_Parking_Facilities_for_Autonomous_Vehicles>.

Correa et al., "Autonomous Car Parking System Through a Cooperative Vehicular Positioning Network", Sensors 2017, Received: Jan. 31, 2017; Accepted: Apr. 10, 2017; Published: Apr. 13, 2017, 848; doi:10.3390/s17040848, 18 pages, <http://www.mdpi.com/journal/sensors>.

"How self-driving cars could shrink parking lots", ScienceDaily, Mar. 28, 2018, University of Toronto Faculty of Applied Science & Engineering, 5 pages, <https://www.sciencedaily.com/releases/2018/03/180328182441.htm>.

\* cited by examiner

OPTIMIZED VEHICLE PARKING

BACKGROUND

The present invention relates generally to the field of automobiles, and more particularly to optimizing vehicle parking.

Autonomous vehicles (AVs) are capable of getting from one location to another location without a driver. AVs can be used for mass transport of goods, for mass transit in urban areas, for commercial people transport, and for private transportation. There are many technologies that enable AVs including a variety of sensors and cameras, computers that utilize machine learning and artificial intelligence, high-performance GPS (global positioning system), radio detection and ranging (radar), light detection and ranging (LIDAR), cloud-based data processing, and smart technologies capable of communicating with road signs, traffic lights, and lane markers. Semi-autonomous vehicles, available for consumers today, include some of the technologies that enable AVs. One feature of some semi-autonomous vehicles is the capability to self-park in one or both of a parallel and perpendicular parking configuration.

SUMMARY OF THE INVENTION

Embodiments of the present invention include an approach for optimizing vehicle parking. In one embodiment, location information associated with a parking area is received. Information about a plurality of vehicles parked in the parking area is determined. The first space located between a first parked vehicle and a first non-movable object located in front of the first parked vehicle is determined. The first space is comprised of a first required space and a first non-required space. The first required space is a minimum space needed in front of the first parked vehicle for the first parked vehicle to depart a parking spot associated with the first parked vehicle. A second space located between the first parked vehicle and a second non-movable object located behind the first parked vehicle is determined. The second space is comprised of a second required space and a second non-required space. The second required space is a minimum space needed behind the first parked vehicle for the first parked vehicle to depart the parking spot associated with the first parked vehicle. A determination is made whether the first non-required space is greater than the second non-required space. Responsive to determining that the first non-required space is greater than the second non-required space, the first parked vehicle is moved towards the first space. After moving the first parked vehicle, the first space is equivalent to the first required space.

DETAILED DESCRIPTION

Embodiments of the present invention recognize that parking a vehicle is often a challenge. Parking space can be limited, and even wasted, when an individual is poor at parallel parking and utilizes an over-sized parking spot for their vehicle or when a large sized vehicle leaves a parking spot and that spot is filled by a much smaller sized vehicle. The problem of wasted parking space may be exacerbated as more fully-autonomous and semi-autonomous vehicles (i.e., AVs) hit the roads and parking said vehicles is controlled by a computer.

Embodiments of the present invention recognize that there may be a method, computer program product, and computer system for optimizing vehicle parking. In an embodiment, the method, computer program product, and computer system can receive information concerning the size of a parking area and the rules and regulations of said area. Space between parked vehicles can be determined and the method, computer program product, and computer system can transmit "move" instructions directly to autonomous vehicles to re-position said vehicles thus eliminating wasted parking space and potentially creating additional parking space for other vehicles. In the embodiment, parked vehicles can be move insignificantly (e.g., move one foot forward) or moved significantly (e.g., (i) to a totally different area of the parking lot such as eleven rows West of the current row or (ii) to a new parking lot such as from current parking lot 'A' to row two of parking lot 'B').

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For ease of reading, fully-autonomous vehicles (i.e., vehicles that can drive without human intervention) and semi-autonomous vehicles (i.e., vehicles that can perform some driving functions but still require limited human intervention) will be referred to as autonomous vehicles (AVs) throughout this paper. All other vehicles will be referred to as non-AVs.

The present invention will now be described in detail with reference to the Figures.

Figure 1:
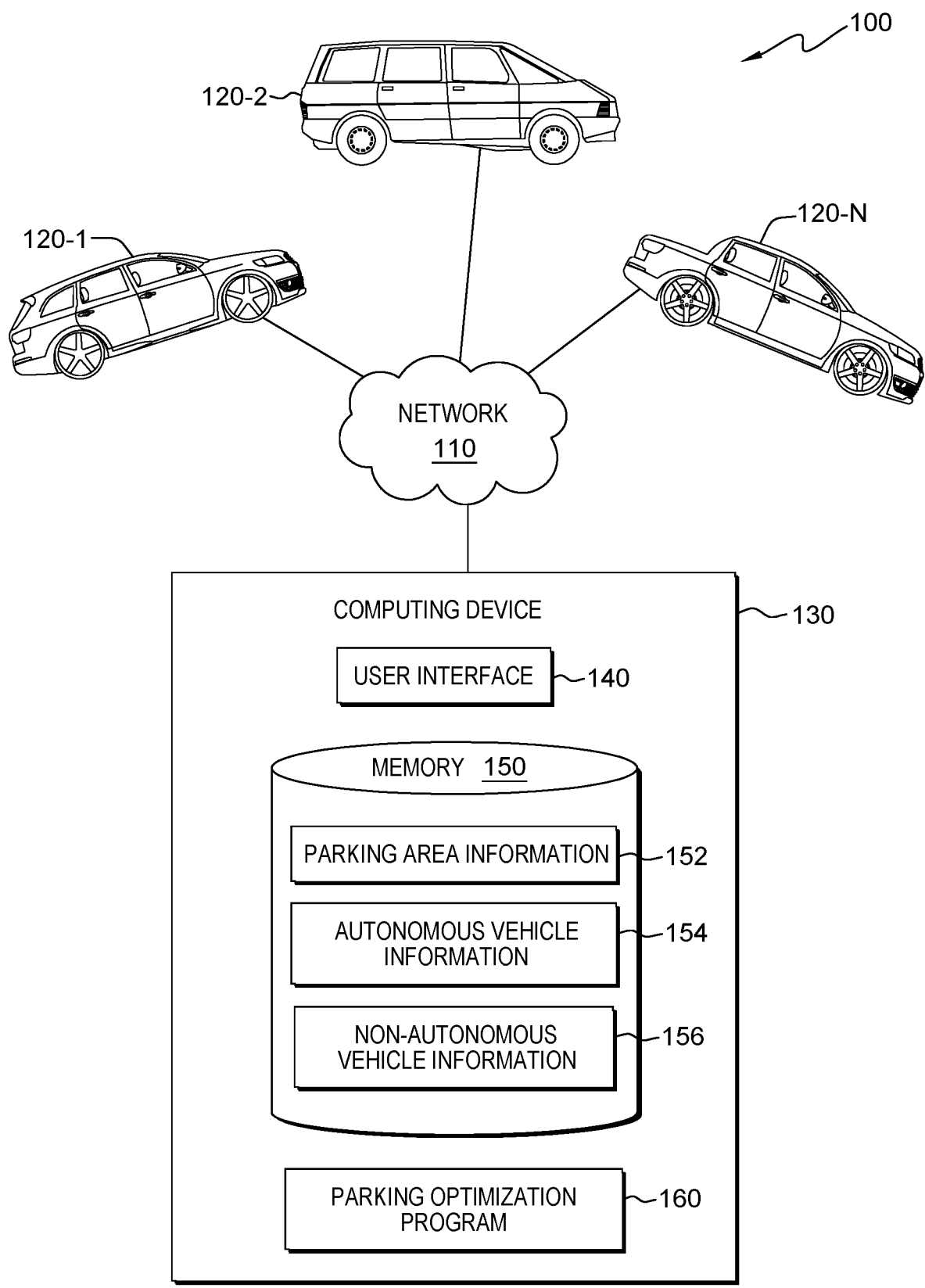
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes autonomous vehicle (AV) 120-1, AV 120-2, AV 120-N, and computing device 130, interconnected by network 110. In example embodiments, computing environment 100 includes other computing devices (not shown in FIG. 1) such as smartwatches, cell phones, smartphones, wearable technology, phablets, tablet computers, laptop computers, desktop computers, other computer servers or any other computer system known in the art, interconnected with AV 120-1, AV 120-2, AV 120-N, and computing device 130 over network 110. For ease of reading, the term AV 120-N will be used when discussing features of any of AV 120-1, AV 120-2, and AV 120-N.

According to embodiments of the present invention, AV 120-N is an autonomous vehicle (AV) capable of driving without, or with limited, human intervention. AV 120-N is equipped with and utilizes various kinds of technologies. For example, AV 120-N includes global positioning system (GPS) technology which aids in location and navigation functions. AV 120-N also includes a plurality of sensors, cameras, and other equipment to avoid collisions. Further, AV 120-N may include augmented reality, where AV 120-N is able to display information to humans in new and innovative ways. Further yet, AV 120-N includes a capability via cameras and on-board computers to determine a distance between AV 120-N and objects both in front of and behind AV 120-N. In an embodiment, computing environment 100 includes any number of AV 120-N.

In embodiments of the present invention, AV 120-N and computing device 130 are connected to network 110, which enables AV 120-N and computing device 130 to access other computing devices and/or data not directly stored on AV 120-N and computing device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between AV 120-N and computing device 130, and any other computing devices (not shown in FIG. 1) connected to network 110, in accordance with embodiments of the present invention. In an embodiment, data received by another computing device (not shown in FIG. 1) in computing environment 100 is communicated to AV 120-N and computing device 130 via network 110.

In embodiments of the present invention, computing device 130 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 120 can be a standalone computing device, a management server, a web server, a mobile computing device, or any other electronic device or computing system capable of receiving, transmitting, and processing data. In other embodiments, computing device 130 can represent a computing system utilizing multiple computers as a server system, such as in a cloud computing environment. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 may include internal and external hardware components as depicted and described in further detail with respect to FIG. 4, in accordance with embodiments of the present invention. Computing device 130 also includes user interface (UI) 140, memory 150, and parking optimization program 160.

In an embodiment, user interface 140 provides an interface between a user of computing device 130 and parking optimization program 160. User interface 140 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 140 may also be mobile application software that provides an interface between a user of computing device 130 and parking optimization program 160. Mobile application software, or an "app," is a computer program designed to run on smart phones, tablet computers and other mobile devices. User interface 140 enables a user of computing device 130 to interact with AV 120-N, parking optimization program 160, and other computing device not shown in FIG. 1.

In an embodiment, memory 150 is storage that is written to and/or read by parking optimization program 160, and any other programs and applications on computing device 130. In one embodiment, memory 150 resides on computing device 130. In other embodiments, memory 150 resides on AV 120-N or any other device (not shown) in computing environment 100, in cloud storage or on another computing device accessible via network 110. In yet another embodiment, memory 150 represents multiple storage devices within computing device 130. Memory 150 may be implemented using any volatile or non-volatile storage media for storing information, as known in the art. For example, memory 150 may be implemented with a tape library, optical library, one or more independent hard disk drives, multiple hard disk drives in a redundant array of independent disks (RAID), solid-state drives (SSD), or random-access memory (RAM). Similarly, memory 150 may be implemented with any suitable storage architecture known in the art, such as a relational database, an object-oriented database, or one or more tables. In an embodiment of the present invention, parking optimization program 160, and any other programs and applications (not shown in FIG. 1) operating on computing device 130 may store, read, modify, or write data to memory 150. In an embodiment of the present invention, data stored to memory 150 includes, but is not limited to, data stored to parking area information 152, autonomous vehicle (AV) information 154, and non-autonomous vehicle (AV) information 156.

According to embodiments of the present invention, parking area information 152 is a data structure within memory 150 where information about a plurality of parking areas is stored. In an embodiment, the information includes, but is not limited to, GPS data about the parking areas and parking spots within the parking areas, rules and regulations concerning the plurality of parking areas (e.g., hours available for parking, Holiday hours, vehicle types that are prohibited from using the parking area, etc.), whether a fee is required to use the parking areas, and the like.

In an embodiment, AV information 154 is a data structure within memory 150 for storing the information about AVs parked within one of the pluralities of parking areas. According to an embodiment of the present invention, AV information 154 includes, but is not limited to, the year, make, and model of each of the AVs parked in the parking area and the time each AV entered the parking area and departed the parking area. From the year, make, and model information stored to AV information 154 of an AV, parking optimization program 160 is able to determine a minimum space requirement needed for the AV to depart a parallel parking spot without touching an object in front of or behind the AV by using data, such as turning radius, from the website of the AV manufacturer. Further, an owner of the parking area may define a space requirement between parked vehicles for safety or for any other reasons. For example, a shopping center may want a larger space between vehicles to allow for shopping carts while a sports stadium may want a smaller space between vehicles to maximize the number of parked vehicles in the parking area.

According to embodiments of the present invention, non-AV information 156 is a data structure within memory 150 for storing the information about non-AVs parked within one of the pluralities of parking areas. In an embodiment, the present invention may consider a non-AV as an object that cannot be moved without human intervention. According to embodiments, non-AV information 156 includes, but is not limited to, the make of a non-AV, the license plate of the non-AV, and the location of the non-AV relative to one or more AVs. The information stored to non-AV information 156 is collected by one or more AVs parked within the parking area and transmitted to memory 150 by the one or more AVs.

In an embodiment, parking optimization program 160 can be a program, a subprogram of a larger program, an application, a plurality of applications, or mobile application software, which functions to optimize vehicle parking. A program is a sequence of instructions written by a programmer to perform a specific task. In an embodiment, parking optimization program 160 runs by itself. In other embodiments, parking optimization program 160 depends on system software (not shown in FIG. 1) to execute. In one embodiment, parking optimization program 160 functions as a stand-alone program residing on computing device 130. In another embodiment, parking optimization program 160 works in conjunction with other programs, applications, etc., found in computing environment 100. In yet another embodiment, parking optimization program 160 resides on AV 120-N. In yet another embodiment, parking optimization program 160 resides on other computing devices (not shown in FIG. 1) in computing environment 100, which are interconnected to AV 120-N and computing device 130 via network 110.

In an embodiment, parking optimization program 160 receives information about a plurality of parking areas. Information about the vehicles parked in at least one of the pluralities of parking areas is received by parking optimization program 160. AVs capable of sending space information (i.e., the distance in front of, and behind, the AV to an object within a proximity of the AV) is sent by the AV to parking optimization program 160 where the space information is stored to memory. Wasted, or non-required, space in front of and/or behind the AV is determined by parking optimization program 160. In response to determining that wasted space is observed, parking optimization program 160 transmits one or more move instructions to eliminate the wasted space and possibly create additional parking space within the parking area.

Figure 2:
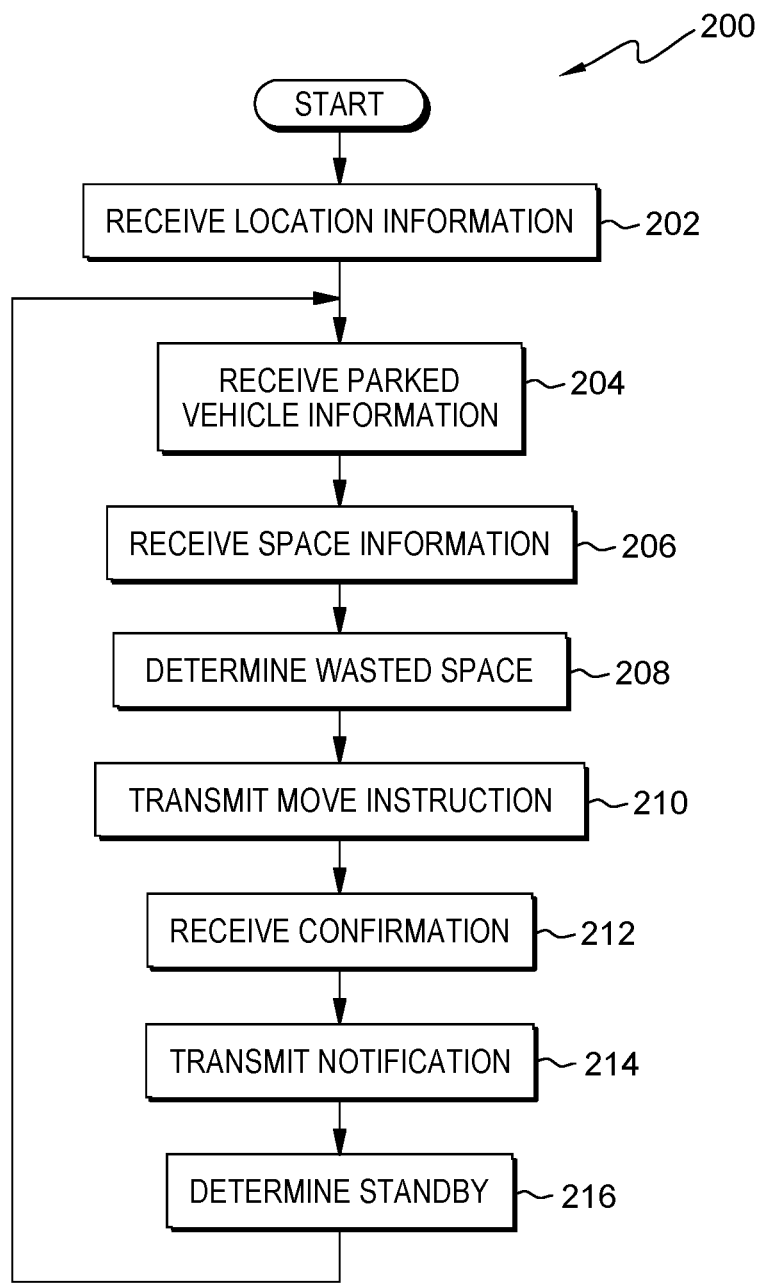
FIG. 2 depicts a flowchart of a program for optimizing vehicle parking, in accordance with an embodiment of the present invention.

FIG. 2 is a flowchart of workflow 200 depicting a method for optimizing vehicle parking. In one embodiment, the method of workflow 200 is performed by parking optimization program 160. In an alternative embodiment, the method of workflow 200 is performed by any other program working with parking optimization program 160. In an embodiment, a user, via user interface 140, invokes workflow 200 upon seeing a vehicle entering and parking within a parking area. In an alternative embodiment, a user invokes workflow 200 upon accessing parking optimization program 160 on computing device 130 via network 110.

In an embodiment, parking optimization program 160 receives location information (step 202). In other words, parking optimization program 160 receives relevant information about one or more parking area locations. According to an embodiment of the present invention, parking optimization program 160 receives the location information from an owner of the parking area when the parking area is privately owned, and from a parking authority when the parking area is public and owned by either the parking authority or a government overseeing the parking authority. Examples of privately-owned parking areas include, but are not limited to, business parking lots, stadium parking lots, and a driveway owned by a homeowner. Examples of public-owned parking areas include, but are not limited to, city parking lots, public parking garages, and city streets. In an embodiment, location information about the parking area includes, but is not limited to, ownership of the parking area, size of the parking area, orientation of the parking spots within the parking area, GPS information about each of the parking spots within the parking area, and rules and regulations governing the parking area (e.g., hours that parking is available, Holiday parking information, etc.). Based on the information received, parking optimization program 160 is able to determine an optimal parking area layout based on an average vehicle size. In an embodiment, parking optimization program 160 receives location information from a user of computing device 130 via user interface 140; parking optimization program 160 stores said location information to parking area information 152 in memory 150 on computing device 130. For example, Joe owns a parking lot next to an event venue and wants to maximize parking revenue during the various events held at the venue. Joe stores data to a program regarding the parking location which is comprised of a plurality of columns where vehicles are parallel parked. In the example, Joe stores the information that there are seven columns available for parking and that the parking area is one hundred and fifty feet long with a fence at each end of the columns.

According to an embodiment of the present invention, parking optimization program 160 receives parked vehicle information (step 204). In other words, parking optimization program 160 receives information about the vehicles parked within a specific parking area. In an embodiment, parking optimization program 160 receives the parked vehicle information directly from one or more AVs. In another embodiment, parking optimization program 160 receives the parked vehicle information from one or more drivers of non-AVs. In yet another embodiment, parking optimization program 160 receives the parked vehicle information from both the AVs and the one or more drivers. According to an embodiment, the parked vehicle information includes, but is not limited to, the year, make, and model of the parked vehicle and the location of the parked vehicle within the parking area. In an embodiment, parking optimization program 160 queries the websites of the manufacturers of the parked vehicles using the Internet. Via the queries, parking optimization program 160 determines the turning radius of each of the parked vehicles, as well as other vehicle dimensions associated with each of the parked vehicles, within the parking area which in turn is used by parking optimization program 160 to determine a required space (i.e., optimal space both in front of and behind a parked vehicle for the parked vehicle to depart a parking spot without hitting an object in close proximity to the parked vehicle. In an embodiment, one or more parked AVs transmit information specific to each of the one or more parked AVs to parking optimization program 160 via network 110. In the embodiment, drivers of non-AVs input the required information about their non-AV to parking optimization program 160 via user interface 140. Further in the embodiment, parking optimization program 160 stores the received information for AVs to AV information 154 on computing device 130, and the received information for non-AVs to non-AV information 156 on computing device 130. For example, a laptop computer used by Joe receives the parked vehicle information (i) directly from one or more AVs and (ii) directly from Joe who inputs information provided by one or more drivers of non-AVs.

In an embodiment, parking optimization program 160 receives space information (step 206). In other words, parking optimization program 160 receives information regarding the existing space between parked vehicles (i.e., the overall space between parked vehicles). According to an embodiment of the present invention, parking optimization program 160 receives the space information directly from one or more parked AVs via the cameras, sensors, and computers included on the parked AVs. In the embodiment, the space information includes both the distance to the nearest object in front of the parked AV and the distance to the nearest object behind the parked vehicle. In an embodiment, parking optimization program 160 receives space information from AV 120-N via network 110. In the embodiment, the received space information is stored to AV information 154 on computing device 130. Further in the embodiment, space information for non-AVs is only available (i) if a non-AV is parked next to an AV or (ii) if the non-AV is similarly equipped with cameras, sensors, and computers as the AVs. For example, the laptop used by Joe receives the following information concerning two vehicles that are parallel parked: (i) a sedan AV transmits a distance in front of the sedan to the nearest object (which is a fence) of two feet; (ii) the sedan AV transmits a distance behind the sedan to the nearest object (which is a pickup truck AV) of four feet; (iii) the pickup truck AV transmits a distance in front of the pickup truck to the nearest object (which is a sedan AV) of four feet (confirming the distance measured by the sedan AV); and (iv) the pickup truck AV transmits a distance behind the pickup truck to the nearest object (which is a fence) of nineteen feet.

According to an embodiment of the present invention, parking optimization program 160 determines wasted space (step 208). In other words, parking optimization program 160 determines wasted, or non-required, space between the parked vehicles. In an embodiment, when parking optimization program 160 does not have information concerning a parked vehicle, said vehicle is considered a non-movable object and the wasted space determination is made considering said non-movable object(s). In an embodiment, parking optimization program 160 determines (i.e., calculates) wasted space between parked vehicles based on the received space information from the AVs as well as the determined (i.e., calculated) optimal, or required, space (based on the turning radius information and other vehicle dimensions for each parked vehicle). In the embodiment, the optimal space is subtracted from the overall space to determine (i.e., calculate) the wasted space (i.e., the required space is subtracted from the overall space to determine the non-required space). When the wasted space value is a positive number, extra parking space can be reclaimed by moving one or more vehicles. When the wasted space value is negative, vehicles are parked too close together and need to be moved (i.e., separated) to achieve at least the optimal space. According to an embodiment, parking optimization program 160 utilizes the received space information from AV 120-N and the determined optimal space to determine wasted space. For example, the program on the laptop used by Joe determines that there is one foot of wasted space in front of the pickup truck AV (as it needs three feet to safely exit the parallel parking spot). If the pickup truck AV moves forward one foot, the new distance behind the pickup truck AV is twenty feet which is enough room to park a waiting sport-utility vehicle (SUV) AV that is sixteen feet in length as the SUV AV requires two feet in front and two feet behind to park.

In an embodiment, parking optimization program 160 transmits move instructions (step 210). In other words, based on the determined wasted, or non-required, space, parking optimization program 160 transmits one or more move instructions to optimize vehicle parking. According to an embodiment of the present invention, parking optimization program 160 transmits the one or more move instructions directly to one or more AVs; in the embodiment, the one or more AVs follow the one or more move instructions to reclaim the determined non-required space. According to another embodiment, parking optimization program 160 transmits the one or more move instructions for non-AVs to a person (e.g., a parking lot attendant) who moves the non-AVs to reclaim the determined non-required space. According to yet another embodiment, parking optimization program 160 transmits one or more move instructions to both one or more AVs and to a person; non-required space is reclaimed after those one or more move instructions are carried out. In an embodiment, parking optimization program 160 transmits one or more move instructions to AV 120-N via network 110. For example, a move instruction of "MOVE FORWARD ONE FOOT" is transmitted to the pickup truck AV.

It should be noted that during the determination (i.e., calculation) of wasted space, parking optimization program 160 is able to make a first determination (i.e., calculation) of non-required space for a first parking layout and then, based on a second parking layout where the non-required space in the first calculation has been eliminated, a second determination (i.e., calculation) of wasted space can be made. For example, if AV-A, AV-B, and AV-C are parallel parked, parking optimization program 160 can determine whether wasted space exists (i) in front of AV-A; (ii) between AV-A and AV-B; (iii) between AV-B and AV-C; and (iv) behind AV-C. In this current parking layout, parking optimization program 160 can determine that the only wasted space is in front of AV-A. Repositioning (i.e., moving) AV-A to eliminate the wasted space will create wasted space behind AV-A. Parking optimization program 160 is able to make the determination of wasted space behind AV-A prior to the moving of AV-A so that vehicle re-positioning can take place in a more efficient manner. This ability of parking optimization program 160 to make wasted space determinations on "future parking layouts" is beneficial for complex parking layouts with many AVs and non-AVs.

According to an embodiment of the present invention, parking optimization program 160 receives confirmation (step 212). In other words, parking optimization program 160 receives one or more confirmations that the one or more AVs and the one or more non-AVs have been moved according to the transmitted one or more move instructions. In an embodiment, the one or more confirmations received by parking optimization program 160 are transmitted by the AVs after the AVs are moved. In another embodiment, the one or more confirmations received by parking optimization program 160 are input to parking optimization program 160 by a human (e.g., a lot attendant). According to an embodiment of the present invention, parking optimization program 160 receives a confirmation from AV 120-N over network 110 confirming that AV 120-N has been moved per the received move instructions. For example, a confirmation is received by the laptop used by Joe confirming that the pickup truck AV has been moved one foot per the received move instruction of "MOVE FORWARD ONE FOOT".

In an embodiment, parking optimization program 160 transmits a notification (step 214). In other words, responsive to receiving one or more notifications that the parked vehicles have been moved, parking optimization program 160 transmits one or more notifications to the primary passenger in the AVs or to the drivers of the non-AVs. According to an embodiment of the present invention, the transmitted notification can include, but is not limited to, a simple audible, visible, or haptic notification to a smartphone indicating that the parked vehicle has been moved but is still generally in the same parking spot; a text message or an e-mail to a smartphone which includes GPS coordinates indicating that the parked vehicle has been moved to a substantially different location; and a photo showing a new location for the parked vehicle. In an embodiment, parking optimization program 160 transmits one or more notifications over network 110 to the appropriate parties responsible to AV 120-N indicating that AV 120-N has been moved. For example, the program on the laptop being used by Joe transmits a notification to the person responsible for the pickup truck AV indicating to the responsible person that the pickup truck AV has been moved one foot forward.

According to an embodiment of the present invention, parking optimization program 160 determines standby (step 216). In other words, responsive to transmitting one or more move instructions, parking optimization program 160 determines a standby period of time. In an embodiment, following the passage of the standby period of time, parking optimization program 160 again uses the parked vehicle information and space information to determine wasted space. In an embodiment, the standby period of time is defined by a person. In another embodiment, the standby period of time is determined by parking optimization program 160 based on historical parking activity in the parking area. According to an embodiment of the present invention, the standby period of time is fixed. According to another embodiment, the standby period of time is variable based on historical parking activity in the parking area. In an embodiment, parking optimization program 160 allows five minutes of standby time and then makes a new determination of wasted space using the latest parked vehicle information and the latest space information. For example, the program on the laptop used by Joe waits five minutes and then determines whether wasted space is found in the event venue parking lot owned by Joe.

In another embodiment of the present invention, parking optimization program 160 is included in AV 120-N. Accordingly, a first AV 120-N can communicate with any number of other AV 120-N with parking optimization program 160 similarly included to coordinate optimized parking. In this embodiment, parking optimization program 160 is able to directly optimize parking and control vehicle movement by utilizing the various systems (previously described) included on AV 120-N to determine wasted space and move AV 120-N to eliminate the determined wasted space between parked vehicles. For example, AV-1, AV-2, and AV-3 are parallel parked with no wasted space between them. If AV-2 departs its parking spot, AV-3 can determine the wasted space created by the departure of AV-2 and AV-3 can direct AV-3 to turn on, move forward, and turn off, thus eliminating the wasted space and allowing another vehicle to park behind AV-3.

Figure 3A:
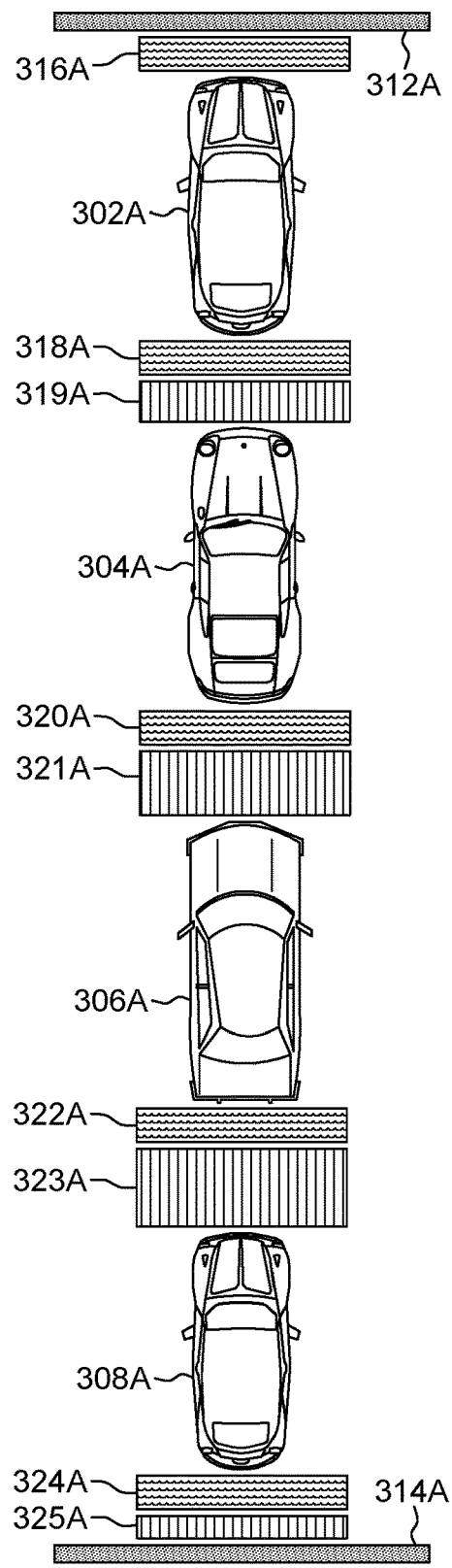
FIG. 3A depicts an example parking scenario with wasted space between parked vehicles, in accordance with an embodiment of the present invention.

FIG. 300 includes two example depictions of parking with wasted space (FIG. 3A) and parking without wasted space (FIG. 3B) after parking optimization program 160 reclaimed wasted space in a parking area. FIG. 3A depicts four AVs that are parallel parked—AV 302A, AV 304A, AV 306A, and AV 308A. Barriers 312A and 314A help to define the parking area. The optimal space in front of AV 302A is space 316A while the optimal space behind AV 302A is space 318A. The optimal space in front of AV 304A is space 318A while the optimal space behind AV 304A is space 320A. The optimal space in front of AV 306A is space 320A while the optimal space behind AV 306A is space 322A. The optimal space in front of AV 308A is space 322A while the optimal space behind AV 308A is space 324A. Wasted space between AV 302A and AV 304A, as determined by parking optimization program 160, is space 319A. Wasted space between AV 304A and AV 306A, as determined by parking optimization program 160, is space 321A. Wasted space between AV 306A and AV 308A, as determined by parking optimization program 160, is space 323A. Wasted space behind AV 308A, as determined by parking optimization program 160, is space 325A.

Figure 3B:
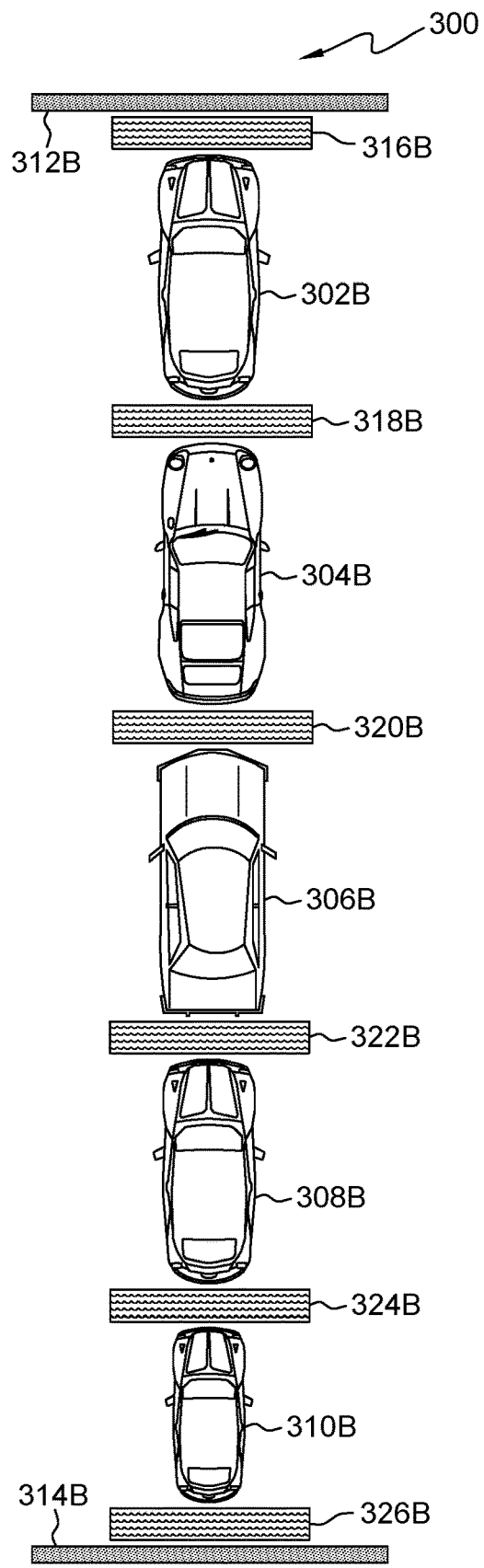
FIG. 3B depicts an example parking scenario without wasted space between parked vehicles, in accordance with an embodiment of the present invention.

FIG. 3B depicts the parking layout after move instructions from parking optimization program 160 are transmitted to and followed by AV 302A, AV 304A, AV 306A and AV 308A thus, eliminating the wasted space. Optimal space 316B remains in front of AV 302B. Space 319A (i.e., wasted space) is eliminated by moving AV 304A forward; this is shown by only showing optimal space 318B between AV 302B and AV 304B. Space 321A (i.e., wasted space) is eliminated by moving AV 306A forward; this is shown by only showing optimal space 320B between AV 304B and AV 306B. Space 323A (i.e., wasted space) is eliminated by moving AV 308A forward; this is shown by only showing optimal space 322B between AV 306B and AV 308B. Space 325A (i.e., wasted space) is eliminated by moving AV 308A forward; this is shown by only showing optimal space 324B behind AV 308B. The result of having moved the AVs forward, as shown by new positions AV 302B, AV 304B, AV 306B, and AV 308B, is the creation of parking space for AV 310B, which has optimal space 324B in front and optimal space 326B behind AV 310B. Barriers 312B and 314B remain to help define the parking area.

Figure 4:
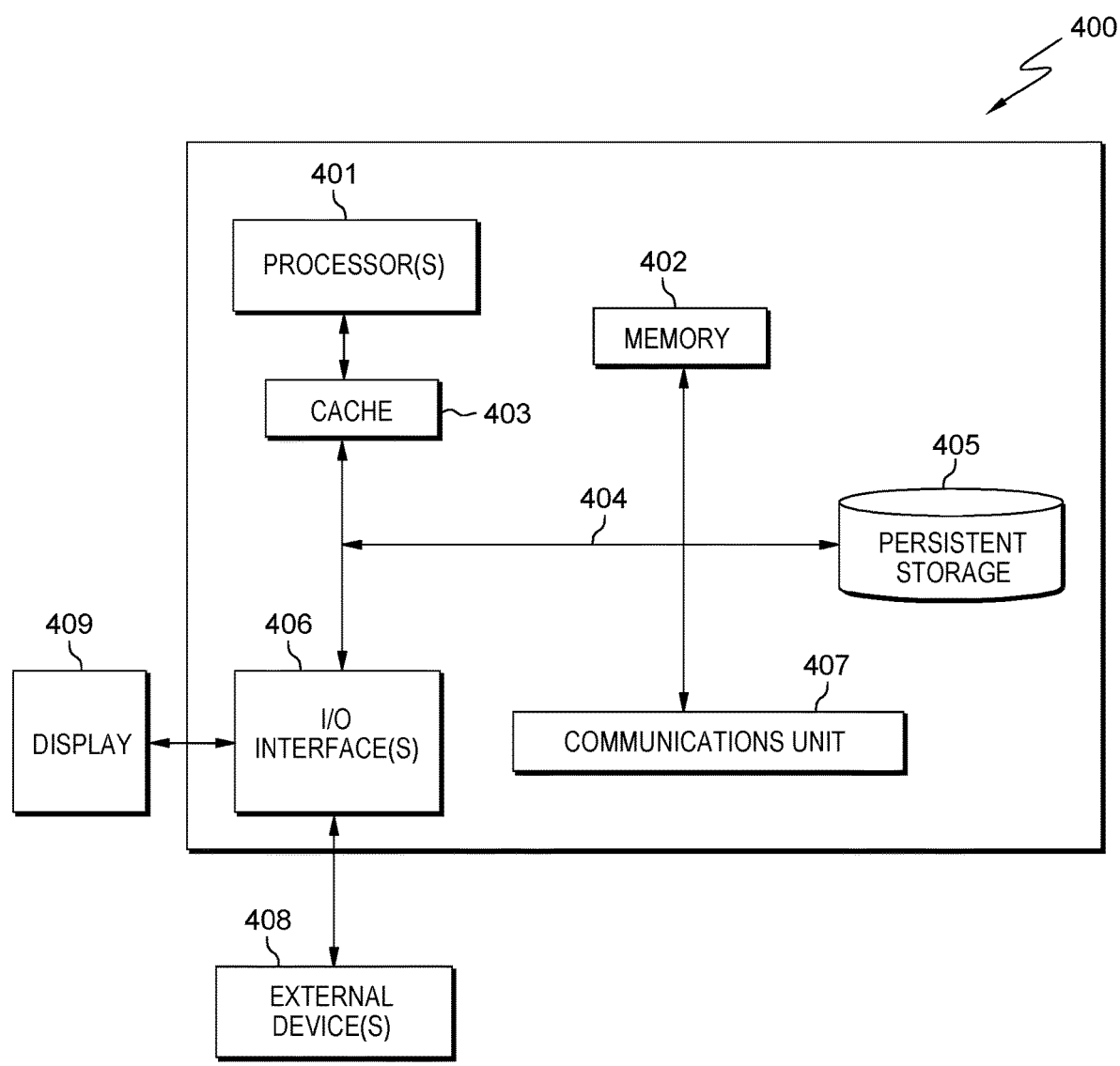
FIG. 4 depicts a block diagram of components of the computing environment of FIG. 1, in accordance with an embodiment of the present invention.

FIG. 4 depicts computer system 400, which is an example of a system that includes parking optimization program 160. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    receiving, by one or more computer processors, location information associated with a parking area;
    determining, by one or more computer processors, an optimal layout for the parking area based on the location information;
    determining, by one or more computer processors, information about a plurality of vehicles parked in the parking area, wherein the plurality of vehicles includes one or more autonomous vehicles and one or more non-autonomous vehicles;
    determining, by one or more computer processors, a required space for each parked vehicle of the plurality of vehicles parked in the parking area based on the information about the plurality of vehicles parked in the parking area, wherein the required space represents a space required both in front of and behind each parked vehicle for each parked vehicle to be able depart a respective parking spot;
    receiving, by one or more computer processors, space information about current space between each parked vehicle of the plurality of vehicles parking in the parking area, wherein the space information for the one or more autonomous vehicles is received directly from the one or more autonomous vehicles and the space information for the one or more non-autonomous vehicles is received if the one or more non-autonomous vehicles is parked next to at least one of the one or more autonomous vehicles or if the one or more non-autonomous vehicles is equipped with external cameras or sensors;
    responsive to not receiving the space information for at least one of the one or more non-autonomous vehicles, designating, by one or more computer processors, the at least one of the one or more non-autonomous vehicles as a non-movable object;
    determining, by one or more computer processors, wasted space between at least one of the plurality of vehicles based on the required space for each parked vehicle, the space information received, and the at least one of the one or more non-autonomous vehicles designated as the non-movable object; and
    transmitting, by one or more computer processors, move instructions to each of the one or more autonomous vehicles that are associated with the wasted space.

2. The method of claim 1, further comprising:
    receiving, by one or more computer processors, a first confirmation that each of the one or more autonomous vehicles to which the move instructions were transmitted was moved; and
    transmitting, by one or more computer processors, a first notification to each person associated with the one or more autonomous vehicles that was moved.

3. The method of claim 2, wherein the first notification includes a respective first new location of the one or more autonomous vehicles that was moved.

4. The method of claim 1, wherein determining the required space for each parked vehicle of the plurality of vehicles parked in the parking area comprises:
    determining, by one or more computer processors, a turning radius of each parked vehicle;
    determining, by one or more computer processors, one or more dimensions associated with each parked vehicle; and
    determining, by one or more computer processors, the required space for each parked vehicle based on the respective turning radius and the respective one or more dimensions.

5. The method of claim 1, wherein the location information associated with the parking area includes at least ownership of the parking area, size of the parking area, orientation of the parking spots within the parking area, global positioning system information about each of the parking spots within the parking area, and rules and regulations governing the parking area.

6. The method of claim 1, wherein the information about the plurality of vehicles parked in the parking area includes at least a year, make, and model of each of the vehicles parked in the parking area, a time each parked vehicle entered the parking area, a time each parked vehicle departed the parking area, and a turning radius for each vehicle parked in the parking area.

7. A computer program product, the computer program product comprising:
one or more computer readable storage media; and
program instructions stored on the one or more computer readable storage media, the program instructions comprising:
program instructions to receive location information associated with a parking area;
program instructions to determine an optimal layout for the parking area based on the location information;
program instructions to determine information about a plurality of vehicles parked in the parking area, wherein the plurality of vehicles includes one or more autonomous vehicles and one or more non-autonomous vehicles;
program instructions to determine a required space for each parked vehicle of the plurality of vehicles parked in the parking area based on the information about the plurality of vehicles parked in the parking area, wherein the required space represents a space required both in front of and behind each parked vehicle for each parked vehicle to be able depart a respective parking spot;
program instructions to receive space information about current space between each parked vehicle of the plurality of vehicles parking in the parking area, wherein the space information for the one or more autonomous vehicles is received directly from the one or more autonomous vehicles and the space information for the one or more non-autonomous vehicles is received if the one or more non-autonomous vehicles is parked next to at least one of the one or more autonomous vehicles or if the one or more non-autonomous vehicles is equipped with external cameras or sensors;
responsive to not receiving the space information for at least one of the one or more non-autonomous vehicles, program instructions to designate the at least one of the one or more non-autonomous vehicles as a non-movable object;
program instructions to determine wasted space between at least one of the plurality of vehicles based on the required space for each parked vehicle, the space information received, and the at least one of the one or more non-autonomous vehicles designated as the non-movable object; and
program instructions to transmit move instructions to each of the one or more autonomous vehicles that are associated with the wasted space.

8. The computer program product of claim 7, further comprising program instructions stored on the one or more computer readable storage media, to:
receive a first confirmation that each of the one or more autonomous vehicles to which the move instructions were transmitted was moved; and
transmit a first notification to each person associated with the one or more autonomous vehicles that was moved.

9. The computer program product of claim 8, wherein the first notification includes a respective first new location of the one or more autonomous vehicles that was moved.

10. The computer program product of claim 7, wherein the program instructions to determine the required space for each parked vehicle of the plurality of vehicles parked in the parking area comprise:
program instructions to determine a turning radius of each parked vehicle;
program instructions to determine one or more dimensions associated with each parked vehicle; and
program instructions to determine the required space for each parked vehicle based on the respective turning radius and the respective one or more dimensions.

11. The computer program product of claim 7, wherein the location information associated with the parking area includes at least ownership of the parking area, size of the parking area, orientation of the parking spots within the parking area, global positioning system information about each of the parking spots within the parking area, and rules and regulations governing the parking area.

12. The computer program product of claim 7, wherein the information about the plurality of vehicles parked in the parking area includes at least a year, make, and model of each of the vehicles parked in the parking area, a time each parked vehicle entered the parking area, a time each parked vehicle departed the parking area, and a turning radius for each vehicle parked in the parking area.

13. A computer system, the computer system comprising:
one or more computer processors;
one or more computer readable storage media; and
program instructions stored on the one or more computer readable storage media for execution by at least one of the one or more computer processors, the program instructions comprising:
program instructions to receive location information associated with a parking area;
program instructions to determine an optimal layout for the parking area based on the location information;
program instructions to determine information about a plurality of vehicles parked in the parking area, wherein the plurality of vehicles includes one or more autonomous vehicles and one or more non-autonomous vehicles;
program instructions to determine a required space for each parked vehicle of the plurality of vehicles parked in the parking area based on the information about the plurality of vehicles parked in the parking area, wherein the required space represents a space required both in front of and behind each parked vehicle for each parked vehicle to be able depart a respective parking spot;
program instructions to receive space information about current space between each parked vehicle of the plurality of vehicles parking in the parking area, wherein the space information for the one or more autonomous vehicles is received directly from the one or more autonomous vehicles and the space information for the one or more non-autonomous vehicles is received if the one or more non-autonomous vehicles is parked next to at least one of the one or more autonomous vehicles or if the one or more non-autonomous vehicles is equipped with external cameras or sensors;
responsive to not receiving the space information for at least one of the one or more non-autonomous vehicles, program instructions to designate the at least one of the one or more non-autonomous vehicles as a non-movable object;

program instructions to determine wasted space between at least one of the plurality of vehicles based on the required space for each parked vehicle, the space information received, and the at least one of the one or more non-autonomous vehicles designated as the non-movable object; and program instructions to transmit move instructions to each of the one or more autonomous vehicles that are associated with the wasted space.

14. The computer system of claim 13, further comprising program instructions stored on the one or more computer readable storage media for execution by at least one of the one or more computer processors, to:

receive a first confirmation that each of the one or more autonomous vehicles to which the move instructions were transmitted was moved; and transmit a first notification to each person associated with the one or more autonomous vehicles that was moved.

15. The computer system of claim 14, wherein the first notification includes a respective first new location of the one or more autonomous vehicles that was moved.

\* \* \* \* \*